United States Patent [19]

Sharps, Jr. et al.

[11] Patent Number: 4,872,942
[45] Date of Patent: Oct. 10, 1989

[54] SEAL BAR INCLUDING CLAMPED SEAL ELEMENT

[75] Inventors: Gordon V. Sharps, Jr.; Eric A. St. Phillips, both of Fairport, N.Y.

[73] Assignee: Mobil Oil Corporation, New York, N.Y.

[21] Appl. No.: 99,809

[22] Filed: Sep. 22, 1987

[51] Int. Cl.⁴ .................. B32B 31/18; B32B 31/20; B65B 61/10
[52] U.S. Cl. ................ 156/515; 156/530; 156/581; 156/583.2; 493/203
[58] Field of Search ............ 156/515, 530, 581, 583.2, 156/583.1, 251; 493/208, 203; 83/674

[56] References Cited

U.S. PATENT DOCUMENTS

| | | | |
|---|---|---|---|
| 2,229,121 | 1/1941 | Nye | 493/203 |
| 3,047,991 | 8/1962 | Siegel | 156/515 |
| 3,251,256 | 5/1966 | McGrath | 83/674 |
| 3,531,359 | 9/1970 | Jones et al. | 156/515 |
| 3,536,568 | 10/1970 | Rothstein | 156/515 |
| 3,574,039 | 4/1971 | Fehr et al. | 156/515 |
| 3,614,383 | 10/1971 | Watts | 156/515 |
| 3,618,439 | 11/1971 | Zelnick | 156/515 |
| 3,640,790 | 2/1972 | Rowley et al. | 156/251 |
| 3,687,789 | 8/1972 | Wheeler | 156/515 |
| 3,765,990 | 10/1973 | Histed et al. | 156/515 |
| 3,775,225 | 11/1973 | Schott, Jr. | 156/510 |
| 3,883,389 | 5/1975 | Schott, Jr. | 156/583.1 |
| 4,171,605 | 10/1979 | Putnam, Jr. et al. | 53/552 |
| 4,248,701 | 2/1981 | Wenzel | 209/363 |
| 4,380,484 | 4/1983 | Repik et al. | 156/251 |
| 4,485,295 | 11/1984 | Kellermeyer | 156/515 |
| 4,502,906 | 3/1985 | Young et al. | 156/251 |
| 4,517,790 | 5/1985 | Kreager | 53/552 |
| 4,522,575 | 6/1985 | Tischer et al. | 418/55 |
| 4,742,741 | 5/1988 | Hallberg | 83/674 |

*Primary Examiner*—George F. Lesmes
*Assistant Examiner*—J. Davis
*Attorney, Agent, or Firm*—Alexander J. McKillop; Charles J. Speciale

[57] ABSTRACT

A seal bar including a clamped seal element for rotary side seal machines and, more particularly, to a thin ribbon-like seal element constituted of a metallic high-temperature resistant material for the concurrent heat sealing and cutting through of superimposed layers of a thermoplastic film material.

7 Claims, 1 Drawing Sheet

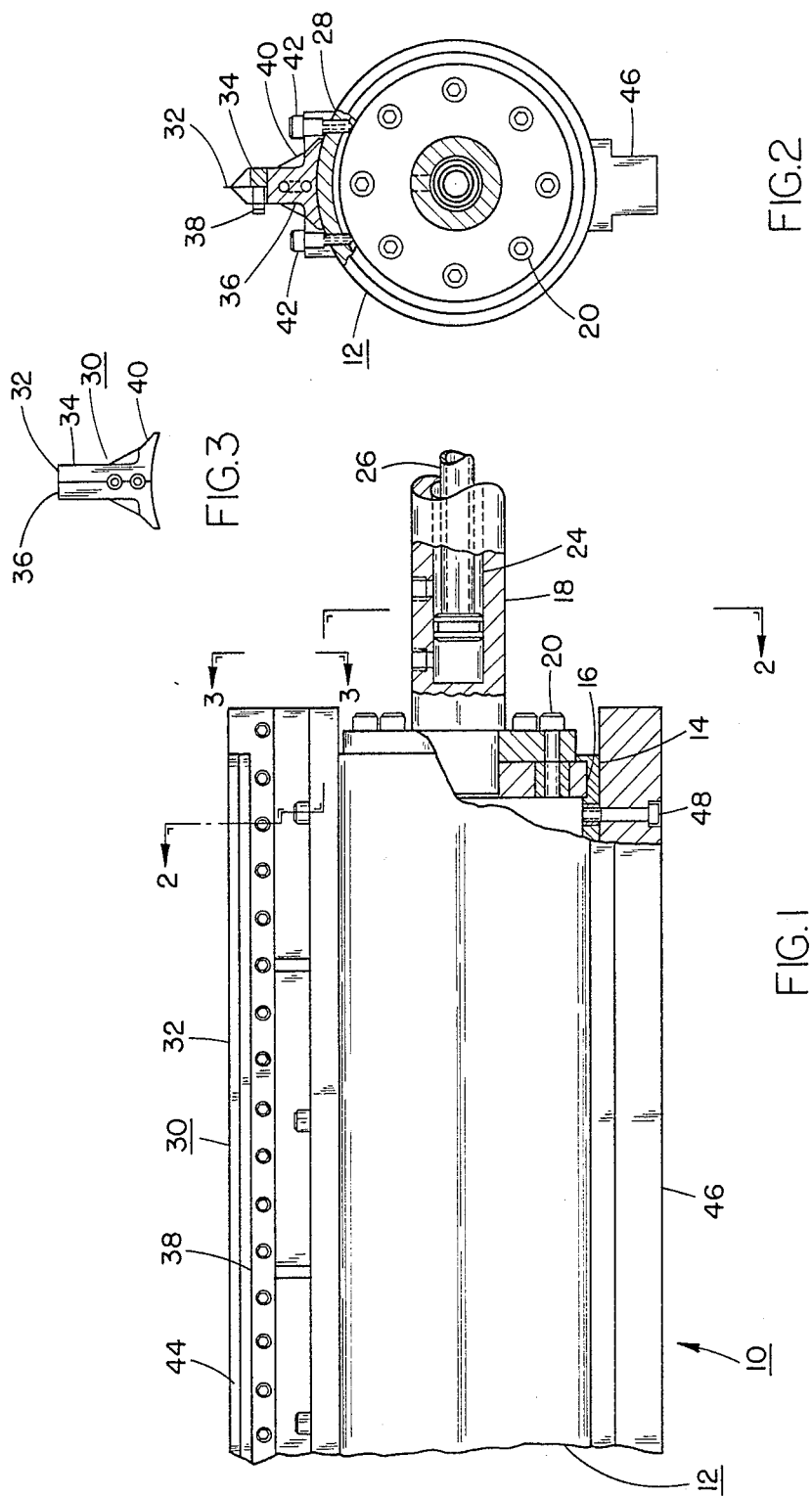

SEAL BAR INCLUDING CLAMPED SEAL ELEMENT

BACKGROUND OF THE INVENTION

1. Field of the Invention

The present invention relates to a seal bar including a clamped seal element for rotary side seal machines and, more particularly, relates to a thin ribbon-like seal element constituted of a metallic high-temperature resistant material for the concurrent heat sealing and cutting through of superimposed layers of a thermoplastic film material.

The heat sealing and cutting through of superimposed layers of heat-sealable thermoplastic film materials, especially film materials for plastic bags which have side seals formed therein, as is well known in the plastic bag-making industry, frequently utilizes heat sealing arrangements incorporating elongated seal bars which are heated; for instance, through ultrasonic energy or an inductive electrical current. During operation of the arrangement, the seal bars are either reciprocated or rotated so as to contact the superimposed layers of the thermoplastic film material, to thereby fuse the layers together and thereby produce a heat seal between the film material layers, and to thereafter separate the heat-sealed layers through the intermediary of cutting blades or heated cutting elements which are interposed between spaced heated seal bars or located in close proximity thereto, so as to separate the heat-sealed film layers into separate segments.

2. Discussion of the Prior Art

Among various types of apparatus and methods which are known and employed in the technology for the formation of heat seals and the concommitant or closely following cutting through of the heat-sealed superimposed thermoplastic film material layers, especially for the side seals of plastic bags or the like, a considerable number of devices employ ultrasonics or an electrical current for either continuously or periodically heating a seal bar and/or heating a cutting element, the latter of which may be constituted of the so-called thin metallic ribbon-type cutter blades.

Fehr, et al. U.S. Pat. No. 3,574,039 discloses a film sealing and cutting apparatus wherein a transverse seal is formed to extend across the width of two superimposed thermoplastic film material layers through the physical application thereto of a pair of parallel spaced jaws each containing an electrically heated sealing bar which will fuse the film layers together, so as to produce a pair of closely spaced parallel heat seals. Thereafter, a heated cutting member in the shape of a thin blade which is interposed between the heated sealing bars is advanced so as to cut through and separate the sealed film layers intermediate the parallel heat seals. This particular type of apparatus provides for the continuous heating of the sealing bars and the additional separate heating of the cutting member, while also imparting the sealing and cutting operation in two sequential operational steps, thereby rendering the entire apparatus and method highly energy-intensive and complex as being adapted primarily for use with intermittently advanced thermoplastic film web materials.

Rowley, et al. U.S. Pat. No. 3,640,790 describes an apparatus and method for the heat sealing and cutting through of superimposed layers of a heat-sealable thermoplastic film, in which a combined heat sealing bar and cutter fuses and melts the superimposed film layers through the application of pressure and heat thereto along the length of the sealing bar, thereby producing a heat seal between the layers while weakening the plastic material so as to facilitate the separation thereof along the seal while maintaining the facing and separated edges of the segments of the thermoplastic film in a sealed relationship with regard to the superimposed film layers.

Wheeler U.S. Pat. No. 3,687,789 relates to a heat sealing apparatus including a pair of closely spaced, parallel seal bars adapted to be heated so as to produce, upon contact, a pair of closely spaced longitudinal seals extending across superimposed layers of a heat-sealable thermoplastic film material, and with a heated metallic ribbon cutter being thereafter adapted to cut through the previously sealed film layers in the region of the seal so as to separate the film material into individual segments. This apparatus necessitates the ribbon cutting member be heated separately from and moved relative to the heated seal bars, rendering the entire apparatus and method of use thereof highly energy-intensive and relatively complex, while also being adapted primarily for the heat sealing of intermittently advanced webs of thermoplastic film material.

Schott, Jr. U.S. Pat. No. 3,775,225 discloses a machine for perforating and heat sealing a web of a multilayered thermoplastic film material for plastic bags, which incorporates a pair of heated elongate seal bars contacting the superimposed film layers to form two closely spaced parallel heat seals. Thereafter cutting of the sealed film layers is effected intermediate the formed heat seals through the advance of a heated cutting element between the seal bars, which may be a thin metallic ribbon-like cutting blade. This particular structure and method is also highly energy-intensive and complex, and is primarily designed for us with intermittently advanced webs of a thermoplastic film material.

Similarly, Kreager U.S. Pat. No. 4,517,790 provides for the formation of seals on packages or the like through reciprocating components in which an ultrasonic rotatable sealing bar or horn structure imparts a pair of parallel heat seals to superimposed layers of a thermoplastic film material, and with the film being cut into separate segments intermediate the formed seals through the action of a thin-bladed cutting element.

In order to improve upon the thermoplastic material heat sealing and cutting apparatus and methods of the prior art, somewhat more recently a heated seal bar structure has been developed for a rotary side seal plastic bag machine, wherein the heated seal bar is supported as a radial projection extending longitudinally along a rotating shaft or drum, and is fastened thereto by a series of post-like standoffs having ceramic insulating sleeves thereon. The seal bar, which is constituted of an electrically-conductive, high temperature resistant metallic material or alloy, such as nichrome or the like, comprises a generally thickly cross-sectioned electrically-heated resistance element which is generally heated to a temperature of approximately 1500° F. through the constant application of an electrical current. During rotation of the shaft or drum, the seal bar element, which has a beveled taper along its outer edge to form a sealing and cutting edge, intersects an advancing lay-flat web of superimposed plastic film materials once for each revolution of the rotary shaft, so as to concurrently heat seal and cut through the superimposed film layers upon contact therewith.

Although this type of sealing bar device provides for a much simpler structure in comparison with those of the above-mentioned prior art patents, the elongate seal bar is subject to various limitations during the protracted use thereof. Thus, for instance, the mass of the thick elongate seal bar, which is only beveled toward its sealing and cutting edge, is high and necessitates the application of a constant electrical current to raise the seal bar to the necessary temperature in order to enable the sealing bar to carry out the desired heat sealing and cutting through of the film web layers, thereby resulting in a high electrical power consumption. Furthermore, the employ of a rather thick seal bar element which, when heated red-hot, for example, to a temperature of approximately 1500° F. along its full length, produces a tendency in the bar to sag and warp between its supports, frequently causing difficulties to be encountered in the sealing bar heat sealing and cutting through the film web layers in an acceptable manner. Moreover, inasmuch as the currently employed sealing bar is constituted of rolled steel or similar material, and is imparted 45° bevel or chamfer on each side of the sealing and cutting tip thereof so as to form a narrow sealing and cutting edge along its length, this necessitates precise beveling of the edge, and stoning thereof, rendering the cost of the equipment to be expensive. In addition thereto, in the event of a jam-up of the bag-forming machine, which is a frequently encountered phenomenon in actual practice, the thick or heavy sealing bar is frequently bent to such an extent as to be rendered unusable, and in the course of being bent may readily transmit damaging or even destructive stresses to its supports on the machine. Furthermore, replacing the heavy sealing bar element is, of necessity, a time-consuming procedure, which may increase the idle or downtime of the bag-forming machine, thereby considerably increasing operating and installation costs.

SUMMARY OF THE INVENTION

Accordingly, in order to ameliorate or obviate the limitations and disadvantages encountered in the prior art, and in order to further improve upon the currently employed sealing bar as discussed hereinabove, the present invention provides for a rotary side seal machine for plastic bags incorporating a novel seal bar structure having a thin, rigidly clamped heat seal-forming and cutting element, such as a ribbon constituted of a suitable high-temperature resistant and electrically-conductive metal for instance such as nichrome "A", clamped between a pair of bar members extending along the length thereof, and wherein an exposed edge of the thin ribbon element projecting beyond the clamped portion is thereby stiffened to become extremely rigid and, resultingly, will not warp or sag upon being heated. Furthermore, in order to impart the necessary heat sealing and cutting properties to the exposed portion of the heat sealing element, the latter may be intermittently supplied with a pulsed electrical current to rapidly heat the element to a temperature of approximately 1500° F., in synchronism with the rotational motion of the machine, immediately prior to the contacting of the heated element with and its passage through a layflat web of superimposed layers of a thermoplastic film material, thereby enabling the layers of the film to be almost concurrently sealed together and cut through by the ribbon-like heated seal element.

The thin ribbon element of the clamped seal bar structure, which may be constituted of nichrome "A" or other similarly suitable high-temperature resistant metallic material or alloy, has the ribbon-like element possessing a much higher electrical resistance and lower thermal mass than the presently employed heavier sealing bar structure. Consequently, the thin ribbon-like seal element can be rapidly heated to the desired sealing and cutting temperature through the application of a short pulsed electrical current immediately prior to contacting the layflat thermoplastic film web material, thereby resulting in a significant reduction in the consumption of electrical energy.

A further advantage of the thin ribbon-like clamped seal bar element resides in the enhanced rigidity or stiffness thereof; and inasmuch as the seal bar element bar is rigidly clamped on both sides thereof along its entire length between heavier seal bars which are not heated to the high temperature of the seal bar element; in effect, by the former being insulated with respect to the electrical current, there is a significant reduction in any sagging or warpage thereof during the operation of the arrangement. Moreover, the cost of manufacturing the thin ribbon seal bar element is considerably less than the costs in producing the presently employed sealing bar which is machined, and must be stoned, inasmuch as it can be roll-slit in volume from wide sheet stock, and with no subsequent beveling of the sealing and cutting edge being necessary because of the already relatively thin cross-sectional dimensions of the ribbon seal bar element.

In the event of any jamming and sudden stoppage of the rotary side seal bag forming machine, the clamped thin ribbon-like seal bar element would have the exposed projecting edge thereof easily deflected or flattened over, thereby causing little or practically no damage to the other machine components. The replacement of the thin ribbon-like element is also rendered easier, in that the element is retained on dove-tail slides and a backup or replacement seal bar unit can be installed within a short time interval, allowing for a subsequent workbench replacement of the ribbon seal bar element.

The lower mass and reduced moment of inertia of the thin ribbon-like element, although torsionally and flexurally more rigid than existent seal bar designs, allows the lower mass and a reduced moment of inertia to employ increased rotational speeds for the machine, affording servo-drive capability and/or multiple-head seal bar assemblies so as to greatly enhance machine output capabilities.

Accordingly, it is an object of the present invention to provide for an improved seal bar structure including a novel clamped seal element for the concurrent sealing and cutting through of superimposed layers of a thermoplastic film material A more specific object resides in the provision of a thin ribbon-like metallic heat seal element which is clamped between rigid seal bars, and which is intermittently heated by a pulsed electrical current so as to allow for the rapid heating thereof immediately preceding the contacting with the layers of the heat-sealable thermoplastic film web material.

BRIEF DESCRIPTION OF THE DRAWINGS

Reference may now be had to the following detailed description of an exemplary embodiment of the invention, taken in conjunction with the accompanying drawings; in which:

FIG. 1 illustrates a longitudinal view, partly in section, of one end portion of a support structure for a seal bar unit including a clamped seal element for a rotary side seal machine;

FIG. 2 is a sectional view taken along line 2—2 in FIG. 1; and

FIG. 3 is a fragmentary end view of FIG. 1 taken along line 3—3.

DETAILED DESCRIPTION

Referring now in detail to the drawings, and more specifically to FIGS. 1 and 2, there is disclosed a rotary seal bar arrangement 10 for a rotary side seal machine, which is employed for the forming of heat seals on superimposed layers of a thermoplastic film material, such as side seals for plastic bags and the like.

The seal bar arrangement 10 includes a rotatable drum 12 having a hollow cylinder 14 having end closure plates 16, (only one being shown) and to the latter of which there is centrally fastened a shaft member 18 for connection to a suitable drive unit (not shown) for rotation thereof and constituting support trunnions for the rotatable drum 12. The shaft member 18 is fastened to the end closure plate 16 of the drum by means of suitable fasteners, such as fastening screws 20 which extend through an end flange 22 on the shaft member 18 into threaded bores provided in the end plate of the drum. Although only one end of the arrangement is shown, the opposite end of the drum 12 is of a generally similar construction, and no further detailed description thereof is required.

The shaft member 18 includes a central hollow bore 24 for receiving a conduit 26, which at the inserted end thereof includes a slip-fitted and O-ring sealed head portion to allow for the connection of an electrical supply conduit to convey electrical heating current to the sealing bar arrangement, as described hereinbelow.

Mounted on the outer circumference 28 of the drum 12, and extending in parallel with the longitudinal central axis thereof, is the inventive seal bar structure 30, which includes the rigidly clamped heat sealing and cutting element 32 for simultaneously sealing and cutting through the superimposed layers of the thermoplastic film material. The seal bar structure 30 possess a radially outwardly extending seal bar member 34 which, along the longitudinal length of the drum 12, has a clamping bar component 36 detachably fastened thereto through the intermediary of a plurality of longitudinally spaced recessed locking screws 38. In turn, the entire seal bar structure 30 has a base portion 40 fastened to the cylindrical surface of the drum 12 by a plurality of axially spaced screw members or fasteners 42.

Clamped between the facing surfaces of the seal bar 34 and clamping bar 36 is the thin ribbon-like sealing and cutting element 32, which is preferably constituted of nichrome "A", and which possesses a thickness of less than 0.040 inches, with the seal element having high-temperature resistant and electrically conductive properties. The clamping bars 34, 36 which are held together by the fastening screws 38, are preferably insulated with a temperature-resistant coating or provided with an insert of a high dielectric strength.

With the exception of the radially outwardly projecting edge portion 44, the ribbon-like seal element 32 is clamped on both sides thereof and along its entire length between the bars 34, 36 of the seal bar structure 30, so as to be imparted a high degree of torsional and flexural strength, and resistance to warping or sagging when heated for effecting its sealing and cutting operation.

In order to ensure that the entire arrangement 10 is balanced during high speed rotation, fastened to the cylindrical surface of the drum 12, diametrically opposite the seal bar structure 30, is a longitudinally extending balancing counterweight or flyweight 46; attached thereto by a series of axially spaced recessed locking screws 48, and which equilibrates the weight of the seal bar arrangement to prevent any imbalance to the rotating arrangement. However, instead of the counterweight 46, it is possible to contemplate the provision of a further seal bar structure similar to the structure 30, thereby providing two seals for each revolution of the drum 12.

During the operation of the seal bar structure 30, at each rotation of the drum 12 whereby the seal element 32 contacts the surface of the superimposed layers of the layflat thermoplastic film web material, immediately prior to contacting the thermoplastic film material, a flow of an intermittent or pulsed electrical current is imparted to the thin-ribbon seal element 32 from a suitable source of power (not shown) so as to almost instantaneously heat the element to a temperature of approximately 1500° F., such that when the seal element 32 contacts and cuts through the superimposed thermoplastic film material layers, the ends or edges of the superimposed layers contacting the hot metal will fuse or seal together while, concurrently, the trailing edge of the forward portion of the sealed film material is separated thereby from the leading edge of the subsequently following portion of the film material. Thus, in a practically simultaneous operation, the superimposed thermoplastic film material layers have their edges sealed and cut through by the seal element 32, without the need for separately heating sealing bars and thereafter cutting through the sealed film material layers.

The disclosed inventive seal bar structure provides for a clamped seal and cutting element of thin ribbon-like shape, which is torsionally and flexurally stiffer and more rigid than existing heavy seal bar designs, while possessing a lower mass and a decreased moment of inertia which facilitates the employment of higher rotational machine speeds, servo-drive capability, and/or multiple head seal bar assemblies adapted to be mounted on the rotating drum for increasing machine output capabilities.

Furthermore, the manufacturing cost of the thin ribbon-like seal element 32 is considerably lower than that of existing heavy bar stock seal bars, inasmuch as it can be roll slit in volume from broad sheet stock. Moreover, the use of a thin ribbon-like seal element eliminates the need for machining 45° bevels on each side of a sealing tip, and for stoning, since the seal element has a relatively thin cross-section.

While there has been shown and described what is considered to be a preferred embodiment of the invention, it will of course be understood that various modifications and changes in form or detail could readily be made without departing from the spirit of the invention. It is therefore intended that the invention be not limited to the exact form and detail herein shown and described, nor to anything less than the whole of the invention herein disclosed as hereinafter claimed.

What is claimed is:

1. A device for heat sealing superimposed layers of a layflat web of a thermoplastic film material comprising; a hollow-cylindrical rotatable drum means for a rotary side seal apparatus, a seal bar structure intermittently movable into surface contact with said film layers for imparting an elongated heat seal thereto, said seal bar structure being mounted on the cylindrical surface of said drum means so as to extend in parallel relationship with the longitudinal central axis of said drum means; the improvement comprising: said seal bar structure comprising a first elongated bar member; a second elongated bar member detachably fastened to said first bar member so as to provide flat facing clamping surfaces therebetween; a thin flat elongated ribbon-like seal element constituted of a high temperature-resistant metallic material being clamped along substantially the full length thereof by said first and second bar members between said flat facing clamping surfaces so as to have a longitudinal edge projecting therefrom for contacting said film material and constituting a heat seal element; and means for imparting a pulsed electrical current to said seal element prior to said seal element contacting said film material so as to rapidly heat said seal element to a predetermined temperature for sealing and concurrently cutting through said layers of the thermoplasitc film material.

2. The device as claimed in claim 1, wherein said seal element has a thickness of less than 0.040 inches.

3. The device as claimed in claim 1, wherein said seal element is constituted of nichrome "A".

4. The device as claimed in claim 1, wherein said seal element is heated to a film-contacting temperature of about 1500° F.

5. The device as claimed in claim 1, wherein at least said clamping surfaces of the first and second bar members are covered with a temperature-resistant coating of a high dielectric strength contacting said thin seal element.

6. The device as claimed in claim 1, wherein said pulsed electrical current is supplied to said seal element through the interior of said rotatable drum means.

7. The device as claimed in claim 1, wherein a plurality of said seal bar structures are mounted on the cylindrical surface of said drum means in parallel spaced relationship.

* * * * *